Figure 1:
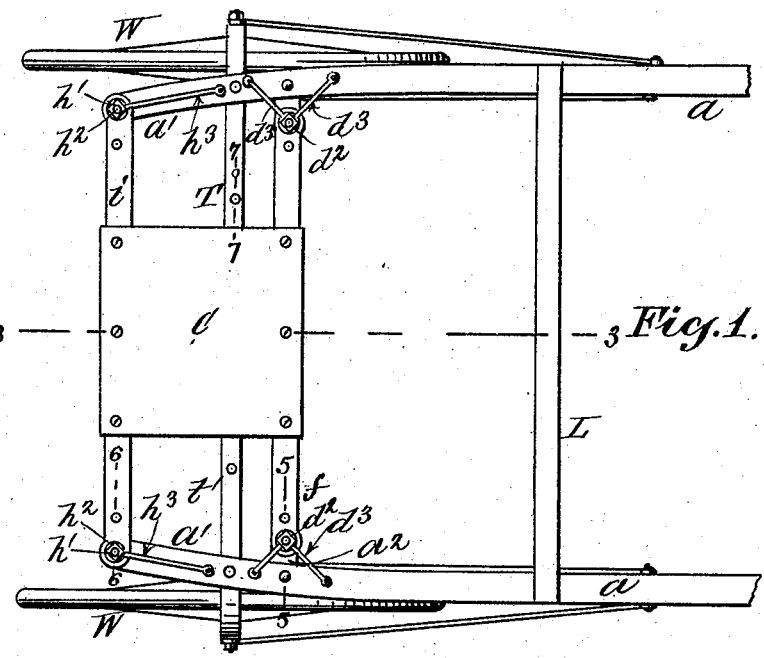

No. 815,615. PATENTED MAR. 20, 1906.
H. J. MILLER.
SULKY.
APPLICATION FILED APR. 18, 1905.

5 SHEETS—SHEET 1.

Witnesses:
D. W. Gardner
R. S. Rope

Inventor:
Henry J. Miller
By his Attorney
Geo. Wm. Miatt

No. 815,615.  
PATENTED MAR. 20, 1906.  
H. J. MILLER.  
SULKY.  
APPLICATION FILED APR. 18, 1905.

5 SHEETS—SHEET 2.

Witnesses:  
D. W. Gardner.  
R. L. Rope.

Inventor:  
Henry J. Miller  
By his Attorney  
Geo. Wm. Miatt

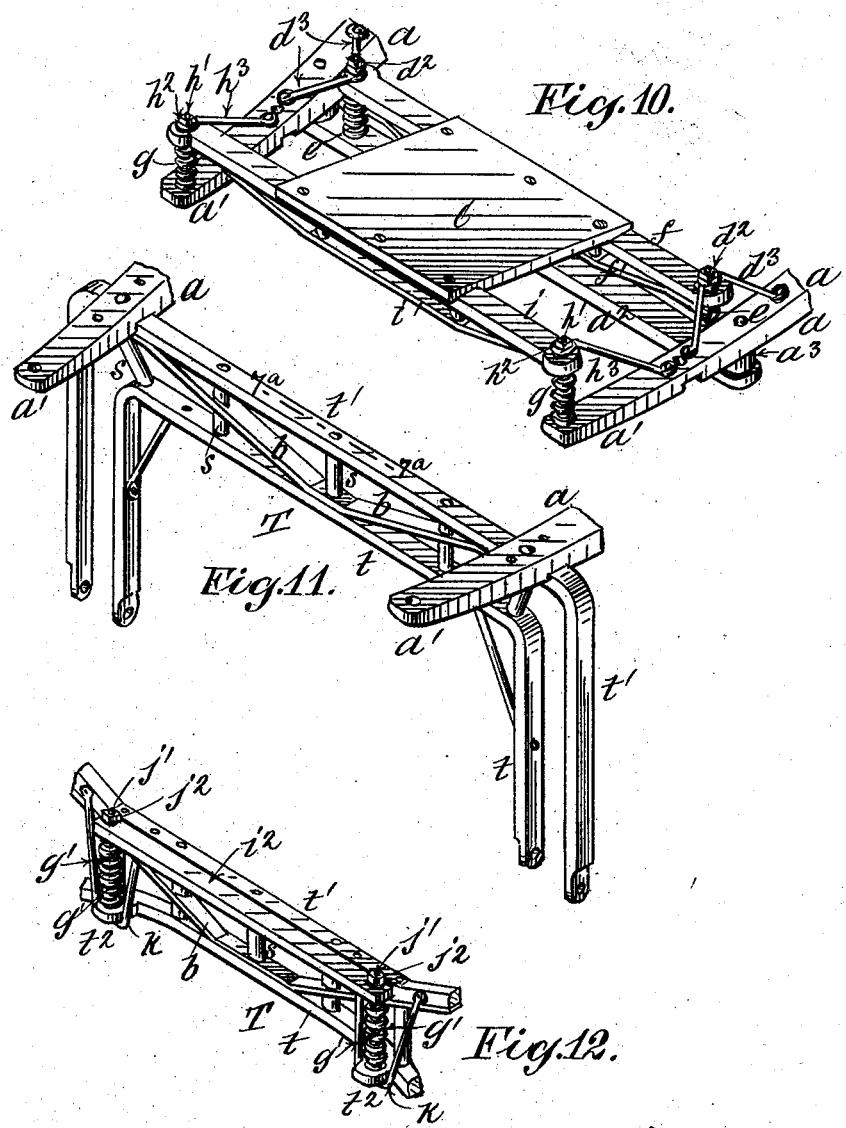

No. 815,615. PATENTED MAR. 20, 1906.
H. J. MILLER.
SULKY.
APPLICATION FILED APR. 18, 1905.
5 SHEETS—SHEET 4.
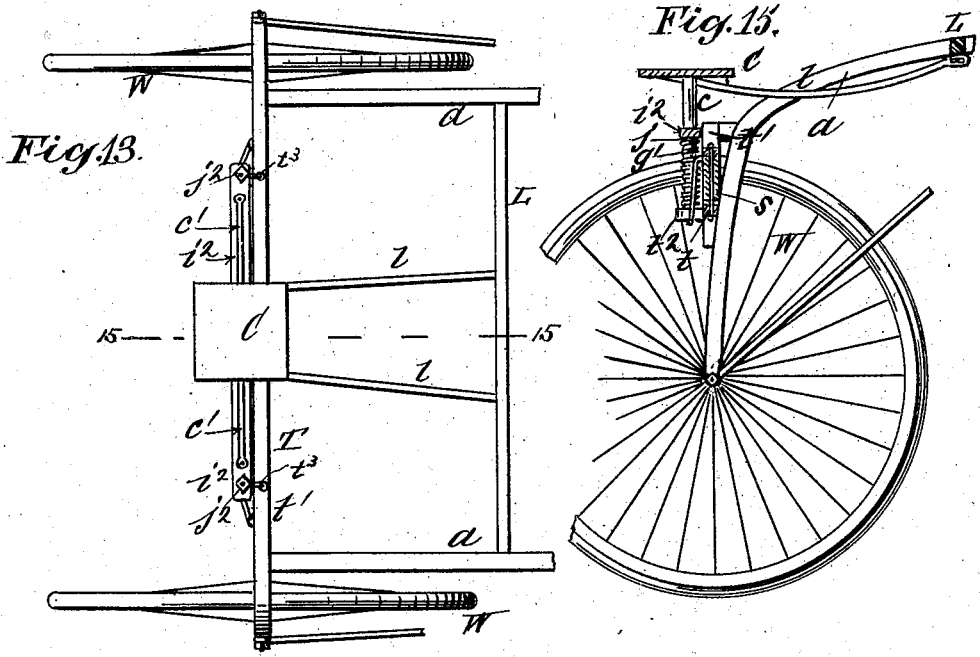
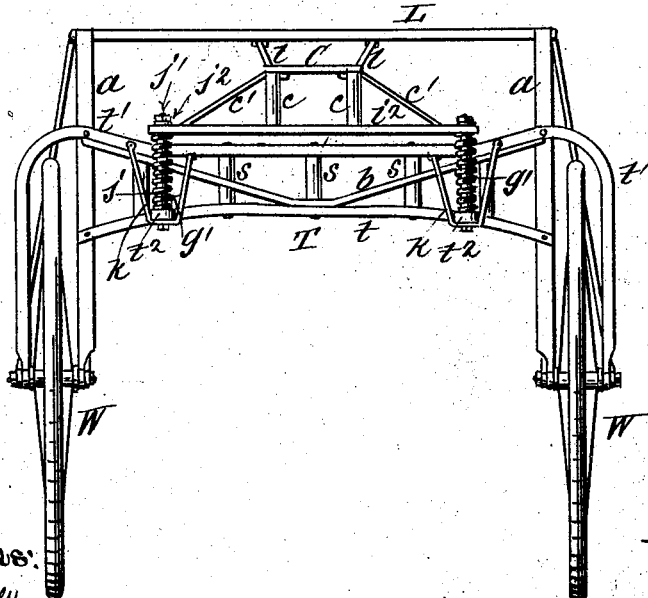
Witnesses:
D. W. Gardner
R. S. Pope
Inventor:
Henry J. Miller
By his Attorney
Geo. Wm. Miatt No. 815,615. PATENTED MAR. 20, 1906.
H. J. MILLER.
SULKY.
APPLICATION FILED APR. 18, 1905.

5 SHEETS—SHEET 5.

Witnesses:
D. W. Gardner
R. S. Rope

Inventor:
Henry J. Miller
By his Attorney
Geo. Wm. Miatt

UNITED STATES PATENT OFFICE.

HENRY J. MILLER, OF GOSHEN, NEW YORK.

SULKY.

No. 815,615.   Specification of Letters Patent.   Patented March 20, 1906.

Application filed April 18, 1905. Serial No. 256,234.

*To all whom it may concern:*

Be it known that I, HENRY J. MILLER, a citizen of the United States, residing at Goshen, Orange county, and State of New York, have invented certain new and useful Improvements in Sulkies and Similar Vehicles, of which the following is a specification sufficient to enable others skilled in the art to which the invention appertains to make and use the same.

My invention relates to the class of light-weight vehicles, known as "sulkies," "road-carts," and the like, designed to be drawn by a single horse and to accommodate only one person, the driver.

The objects are to attain a maximum degree of rigidity combined with lightness of structure; to afford a resilient mount or support for the driver's seat which shall effectually overcome the objections inherent and unavoidable where the seat is attached to a leaf-spring as heretofore; to render the seat more accessible; to attain the minimum of vibration and wear, and to attain other practical advantages hereinafter named.

Distinguishing features of my invention consist in the manner of staying and bracing the wheel-truss and in sustaining the seat on a plurality of spiral springs which are supported laterally to preserve their alinement.

Hence the invention consists, essentially, in the construction and arrangement of parts hereinafter described and claimed specifically, although not necessarily restricted to the identical form of parts shown, since modifications or mechanical expedients may be resorted to with like result and without departing from the spirit and intent of my invention. For instance, the resilient spring-support for the seat of the vehicle may be mounted either upon the wheel-truss or upon the thills, or upon both thills and wheel-truss, as may be found most expedient, the seat being preferably sustained centrally upon a single transverse bar secured to rear extensions of the thills and in close proximity to the wheel-truss for the sake of simplicity and convenience.

Figure 2:
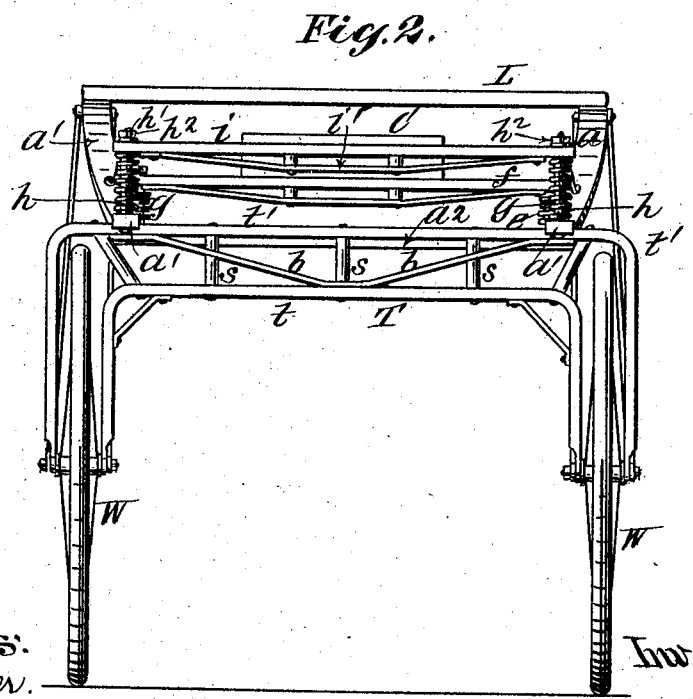
Figure 3:
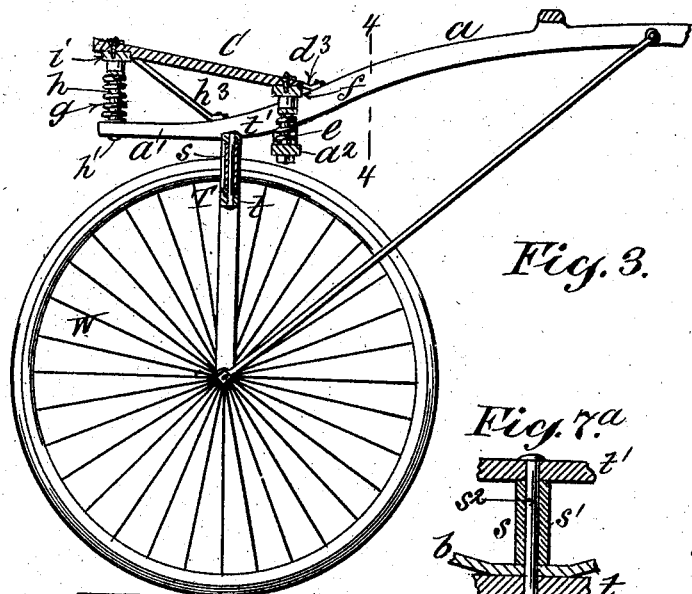
Figure 7A:
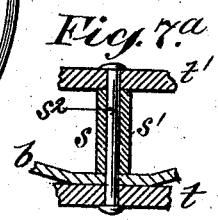
Figure 7:
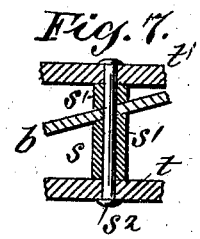
Figure 4:
Figure 5:
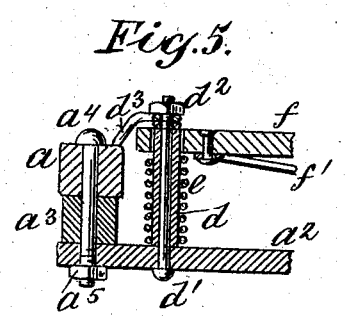
Figure 6:
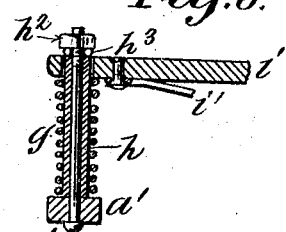
Figure 8:
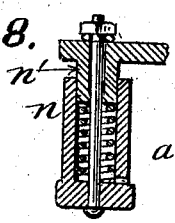
Figure 9:
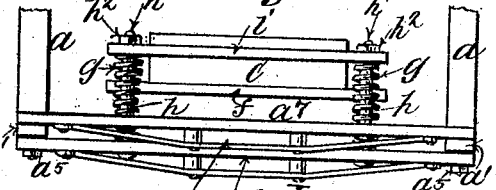
Figure 18:
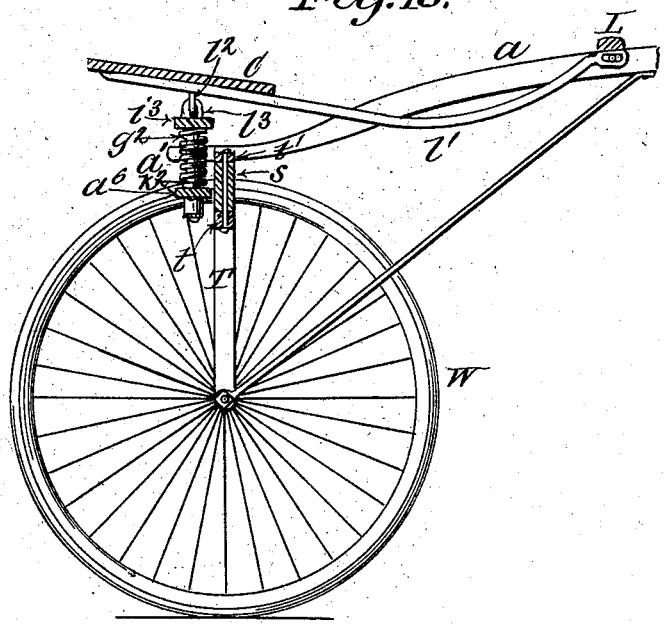
Figure 17:
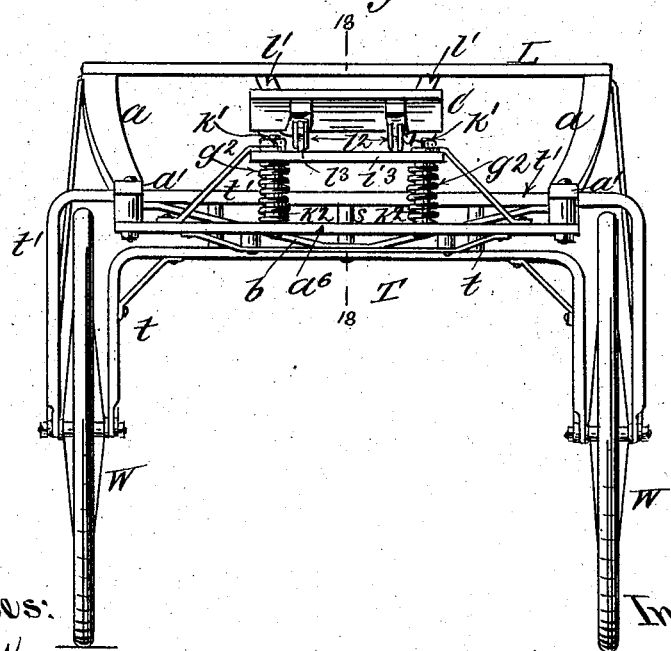

In the accompanying drawings, Figure 1 is a top view of a sulky provided with my improvements, the shafts being broken away. Fig. 2 is a rear view of the same; Fig. 3, a vertical section taken upon plane of line 3 3, Fig. 1; Fig. 4, a vertical section taken upon plane of line 4 4, Fig. 3, looking toward the rear of the vehicle. Fig. 5 is a sectional elevation, upon an enlarged scale, taken upon plane of line 5 5, Fig. 1. Fig. 6 is a sectional elevation, upon an enlarged scale, taken upon plane of line 6 6, Fig. 1. Fig. 7 is a similar view taken upon plane of line 7 7, Fig. 1. Fig. 7$^a$ is a section upon plane of line 7$^a$ 7$^a$, Fig. 11. Fig. 8 is a sectional elevation showing a modification of the lateral support for the compression-springs. Fig. 9 is a rear view illustrating a modification in the arrangement of the seat-springs. Fig. 10 is an isometrical view showing the ends of the shafts and the seat-supports; Fig. 11, an isometrical view of the ends of the shafts and the wheel-truss, the seat-supports being omitted. Fig. 12 is an isometrical view showing a modification of the seat-support adapted to the requirements of a road-cart or other light two-wheeled vehicle. Fig. 13 is a top view of such a vehicle; Fig. 14, a rear view of the same; Fig. 15, a sectional elevation upon plane of line 15 15, Fig. 13; and Fig. 16, an enlarged detail view of the end of the seat-bar. Fig. 17 is a rear view of a modification in which the seat is supported directly upon the wheel-truss. Fig. 18 is a vertical section taken upon plane of line 18 18, Fig. 17.

The wheel-truss T consists of the lower bridge-bar $t$, connecting at either end directly with the axles of the wheels W W (or indirectly therewith through the medium of the thills, as in the modification illustrated in the four figures of the drawings, Sheet 4,) and the upper bridge-bar $t'$, also connected with the axles of the wheels W and straddling the latter, as will be seen more particularly by reference to Figs. 2 and 14, the form of connection with the wheel-axles not being material, as forming no part of the invention. The lower and upper bridge-bars $t$ $t'$ are united by stays $s$ and by braces $b$ $b$, each rigidly secured to both bars $t$ $t'$. The stays $s$ consist of cylindrical tubes $s'$, interposed between the opposed surfaces of the bridge-bars $t$ $t'$ and clamped thereto by bolts $s^2$, thus spacing the said bars with relation to each other and forming an integral structure, which is further strengthened and rendered rigid by the braces $b$ $b$, disposed longitudinally and obliquely between the bridge-bars, the whole constituting a wheel-truss of exceptional lightness, strength, and rigidity, in which there are two novel and distinguishing features—namely, the one-piece upper bridge-bar $t'$, extending over the wheels W and connecting directly with the axles thereof, and the truss-braces $b$, interposed between the said upper and lower bridge-bars and rendering the straddling of the wheels by the truss practicable. The bolts $s^2$ pass through the truss-braces $b$; but the stay-bolt tubes do not, a section of the tubing bearing against either side of the brace $b$ where the stays $s$ cross between the ends of the braces $b$, as shown in Fig. 7. This construction not only affords lightness with strength and rigidity, but it also insures the same degree of support on both sides of each wheel, so that the alinement of the axles is preserved and the wheels run true and parallel to each other. In other words, there is practically no spring or lack of support in the outer journals or bearings, which are as rigid as the inner ones.

In the form of sulky illustrated in the first two sheets of the drawings the thills or shafts $a\ a$ are secured to the upper bridge-bar $t'$ of the truss T, in which case the supports for the seat C are, by preference, mounted on said thills, which have rearward extensions $a'\ a'$ beyond the said upper bridge-bar $t'$.

A cross-bar $a^2$ is attached rigidly to the shafts $a\ a$ in front of the truss T, blocks or washers $a^3$ being interposed between its ends and the under sides of the shafts $a\ a$ to afford the desired drop or depression of said cross-bar $a^2$ below the thills and the top of the truss T. This construction is shown in detail in Fig. 5, by reference to which it will be seen that the thills $a$, the blocks $a^3$, and the cross-bar $a^2$ are secured integrally at each end of the cross-bar by a bolt $a^4$ and nut $a^5$.

On the cross-bar $a^2$ are mounted hollow studs or spring-guards $d\ d$, which afford lateral support to compressible springs $e$, upon which the floating cross-bar $f$ rests. The spring-guards $d$ are secured to the rigid cross-bar $a^2$ by bolts $d'$ and nuts $d^2$, said bolts passing through the hollow studs, as shown in Fig. 5, and being reinforced in position by brackets or stays $d^3$, rigidly secured to the thills, as will be seen by reference to Fig. 1. Where the floating cross-bar $f$ extends practically the whole distance between the thills $a\ a$, it may be reinforced underneath by means of a truss-brace $f'$ to stiffen it centrally, although this will not be necessary in the modification shown in Fig. 9, in which the supporting-springs $g$ are arranged in proximity to the seat C. In this modified arrangement (shown in Fig. 9) in order to support the rear springs $g\ g$ in like manner in proximity to the seat C it is necessary to employ another rigid cross-bar $a^7$, which is secured to and between the rear extensions $a'$ $a'$ of the shafts $a\ a$, said rear cross-bar carrying the spring-guards $h\ h$, secured to it by bolts $h'$ and nuts $h^2$, and the compression-springs $g\ g$, coiling around said guards $h\ h$ and supporting the floating cross-bar $i$, to which the seat is attached in the same manner as set forth in connection with the forward floating cross-bar $f$, as illustrated in Fig. 5. In the arrangement shown in Figs. 1, 2, 3, and 4, however, the spring-guards $h$ are secured directly to the rear extensions $a'$ $a'$ of the thills by the bolts $h'$ and nuts $h^2$, each spring-guard $h$ being reinforced by a brace $h^3$, connected with its bolts at one end and rigidly secured to the rear extension of the thill at the other. In this case, as in that of the modification shown in Fig. 9, the rear floating cross-bar $i$ rests upon and is supported by the compressible springs $g\ g$ in the same manner that the forward floating cross-bar $f$ rests upon and is supported by the compressible springs $e\ e$. The cross-bar in this arrangement on account of its length is also preferably reinforced by a truss-brace $i'$ like that of the forward floating cross-bar $f$ and for a similar reason.

In both the arrangements above described it will be seen that the seat C is screwed, Fig. 1, or otherwise secured to and between the two floating cross-bars $f$ and $i$, which are supported only upon the compressible springs $e$ and $g$. They, the said cross-bars $f$ and $i$, however, as well as the springs $e$ and $g$, are sustained against lateral or horizontal movement in any direction by the guards or uprights $d$ and $h$, so that the seat can move only vertically, or substantially so, or parallel to, and toward and from the cross-bar $a^2$ or said cross-bar and the rear cross-bar $a^7$, as the case may be.

In the modification illustrated in Figs. 12 to 16 of the drawings, which it will be remembered illustrate the embodiment of the essential features of my invention in a road-cart or similar light-weight vehicle, the seat C is secured to a single floating cross-bar $i^2$, resting upon compressible springs $g'\ g'$, supported upon lugs $t^2\ t^2$, formed integral with the lower bridge-bar $t$ of the wheel-truss T, to which lugs $t^2$ the spring guards or standards $j\ j$ are secured by bolts $j'$ and nuts $j^2$, as hereinbefore described in connection with the compressible supporting-springs $e$ and $h$. The upper ends of the bolts $j'$ are reinforced by braces $t^3\ t^3$, rigidly secured to the upper bridge-bar $t'$ of the truss T, and the lugs $t^2$ may be reinforced by braces $k\ k$, also secured to the upper bridge-bar $t'$, as will be understood by reference to Figs. 13 and 14. When the seat is thus supported upon a single floating cross-bar $i^2$, as shown in Figs. 12 to 16 of the drawings referred to, I prefer to connect it with the trace-bar L, which is secured rigidly between the shafts $a\ a$ in the usual manner by one or more rods $l\ l$, secured rigidly to the seat and pivotally to the said trace-bar L, as is customary in road-wagons, with the exception that in the present case the connection with the trace-bar L admits of slight lateral movement—as shown, for instance, in Fig. 16—to compensate for the rectilinear movement of the seat C. As shown in the drawings, the seat C rests upon blocks $c$ $c$, interposed between it and the floating cross-bar $i^2$, and is reinforced in position thereon by braces or stay-rods $c^4$ $c'$, as seen clearly in Fig. 14.

In the modifications shown in Figs. 17 and 18 the seat C is secured to a single short floating cross-bar $i^3$ entirely underneath the seat and resting upon compressible springs $g^2$ $g^2$, supported upon a rigid cross-bar $a^6$, secured to the rear extensions $a'$ $a'$ of the thills in proximity to the wheel-truss T. The seat is connected with the trace-bar L by rods $l'$ $l'$, secured rigidly to the seat and pivotally to said trace-bar, as in the case of the form of cart shown in Figs. 13 to 16, inclusive. The seat is positively coupled to the floating bar $i^3$ by links $l^2$ $l^3$, which admit of slight play or articulation sufficient to compensate for and admit of the free movement of the seat within prescribed limits. These links $l^2$ $l^3$ also separate the seat C from the floating cross-bar $i^3$ sufficiently to afford the requisite amount of clearance between the under side of the seat and the bolts $k'$, which secure the guards $k^2$ of the springs $g^2$ in position on the rigid cross-bar $a^6$.

It will be seen that I have hereinbefore shown and described the seat-sustaining compressible coiled springs as reinforced and sustained laterally by internal guards or standards (as $d$, $h$, and $j$) and this is presumably the simplest and cheapest method of attaining the result desired, although other means may be employed, as by substituting for the internal guide or standard an external casing $n$, as illustrated in Fig. 8, the floating cross-bar for the support of the seat being formed with a plunger $n'$, which enters the casing and rests upon the compressible spring, so as to afford an available degree of motion or play between the parts. It will thus be seen that in this connection the invention obviously contemplates and includes means for simultaneously affording lateral support for the compressible containing-springs and controlling and insuring the rectilineal movement of the seat, so that I do not restrict myself in this respect.

Heretofore, so far as I am aware, where spring-seats have been used at all on this class of vehicles they have been supported on long flat leaf-springs suspended upon and between the thills by link connections, which are objectionable in that they are comparatively loose, rattle, and subject the parts, particularly the overlapping ends of the leaf-springs, to undue and dangerous wear and strain. Furthermore, the yielding and recovery of the long flat spring is too slow and too great a degree of motion is involved, which motion is imparted to the framework with objectionable results, such as throwing the horse out of gait, and may even result in the unseating of the rider, &c. Again, the long transverse flat metal spring as a seat-support in this class of vehicle, in which speed is the main object to be attained, is dangerous in that it is liable to break at a critical time or to be bent out of shape, if not broken. In fact, the practical objections to the mounting of the seat upon a long transverse flat spring are so well known and obvious that sulkies and other light high-speed vehicles are never so constructed at the present day. I obviate all these and other objections by my method of resting the seat upon a resilient cushion consisting, essentially, of a plurality of compressible coiled springs which are supported and sustained laterally, all motion being taken up and neutralized by the springs without transmission to the frame. I thus not only avoid excessive motion, vibration, and wear and attain a smooth running and riding vehicle, but also insure absolute safety both for horse and rider. The breaking or failure of the springs is practically impossible, and even presuming that a spring should break or give out for any reason the seat would still be safely held and sustained in position. While I thus provide for the desired elasticity and resilience within safe limits and neutralize the jar and strain of use, I also attain a light substantial structure by means of my rigid wheel-truss, which also insures the accurate axial alinement of the wheels and their perfect parallelism in use. The rigid wheel-truss also enables me to place the brace-bar farther forward, since it is not needed for strength near the axial line, by which means I render the seat more convenient and accessible. For a like reason I can arrange my seat with long reach of shafts low down behind the horse, and thereby avoid wind resistance.

What I claim as my invention, and desire to secure by Letters Patent, is—

1. In a vehicle of the character described, the combination with the wheels and shafts, of a wheel-truss interposed between said wheels and shafts and formed of a lower bridge-bar and an upper bridge-bar united by stays and braces, upon and between the lower end of which bridge-bars the wheels are journaled, and a floating cross-bar for supporting a seat, said floating bridge-bar being disconnected from the shafts and entirely spring-supported.

2. In a vehicle of the character designated, the combination with the wheels and shafts, of a wheel-truss interposed between said wheels and shafts, and formed of a lower and an upper bridge-bar united by stays and braces, the ends of the upper bridge-bar being formed to extend over the wheels to form outer bearings therefor, and a floating cross-bar for supporting a seat for the purpose described said floating cross-bar being disconnected from the shafts and entirely spring-supported.

3. In a vehicle of the character designated, a wheel-truss, wheels journaled directly in the ends thereof, a floating cross-bar for supporting a seat and shafts attached to the said wheel-truss for the purpose described said floating cross-bar being disconnected from the shafts and entirely spring-supported.

4. In a vehicle of the character designated, a wheel-truss the ends of which straddle wheels journaled therein, said wheels a floating cross-bar for supporting a seat, and shafts attached to said wheel-truss, for the purpose described said floating cross-bar being disconnected from the shafts and entirely spring-supported.

5. In a vehicle of the character designated, a wheel-truss formed of an upper and a lower bridge-bar united by stays and braces a floating cross-bar for supporting a seat, wheels journaled upon and between the adjoining ends of said bridge-bars, and shafts attached to said truss for the purpose described said floating cross-bar being disconnected from the shafts and entirely spring-supported.

6. In a vehicle of the character designated, a wheel-truss formed of an upper bridge-bar and a lower bridge-bar united by transverse stays and diagonal braces floating cross-bar for supporting a seat, wheels journaled between the ends of said bridge-bars, and shafts connected with the said wheel-truss for the purpose described said floating cross-bar being disconnected from the shafts and entirely spring-supported.

7. In a vehicle of the character designated, a seat resting upon a plurality of compressible coil-springs mounted upon stationary parts of the frame and means for preserving the alinement of said springs and a floating cross-bar supported on said springs for the purpose described.

8. In a vehicle of the character designated, a seat resting upon a plurality of compressible coil-springs mounted upon stationary parts of the frame and means for supporting said springs laterally and a floating cross-bar supported on said springs for the purpose described.

9. In a vehicle of the character designated, a seat a floating trussed cross-bar supporting a seat and resting upon a plurality of compressible coiled springs, said springs, and centralizing and supporting guides attached to stationary parts of the vehicle and extending through the said springs and through the said cross-bar for the purpose described.

10. In a vehicle of the character designated, a seat secured to a cross-bar resting upon two compressible coiled springs, mounted upon stationary parts of the framework, said springs, and a truss-brace secured to the under side of said cross-bar between the said springs, for the purpose described.

11. In a vehicle of the character designated, a seat secured to two trussed cross-bars resting upon compressible coiled springs in different planes mounted upon stationary parts of the frame, and means for sustaining said springs and said cross-bars against lateral displacement for the purpose described.

12. In a vehicle of the character designated, the combination of a wheel-truss between the ends of which the wheels are journaled, said wheels, shafts attached to said wheel-truss a seat, a plurality of compressible coil-springs mounted upon the said shafts, and means for sustaining the said springs laterally in position for the purpose set forth.

13. In a vehicle of the character designated, the combination of a wheel-truss between the ends of which the wheels are journaled, said wheels, shafts attached to said wheel-truss a seat, a plurality of compressible coiled springs mounted upon cross-bars rigidly secured to said shafts, and means upon said cross-bars for sustaining the said springs laterally in position for the purpose described.

14. In a vehicle of the character designated, the combination of a wheel-truss to the ends of which the wheels are journaled, said wheels, shafts attached to said wheel-truss and formed with extensions beyond the rear of said truss, a cross-bar rigidly secured to said shafts, two compressible coiled springs on said cross-bar, a compressible coil-spring on each rear extension of the shafts, and a seat supported by said springs for the purpose described.

15. In a vehicle of the character designated, the combination of a wheel-truss to the ends of which the wheels are journaled, said wheels, shafts attached to said wheel-truss and formed with extensions beyond the rear of said truss a cross-bar rigidly secured to said shafts, two compressible coiled springs on said cross-bar, a compressible coil-spring on each rear extension of the shafts, means for preventing lateral displacement of each and all of said four springs, and a seat supported by said springs for the purpose described.

16. In a vehicle of the character designated, the combination of a wheel-truss to the ends of which the wheels are journaled, said wheels, shafts attached to the said wheel-truss and formed with extensions beyond the rear of said truss, compressible coiled springs in front of the said wheel-truss, compressible coiled springs supported upon the shafts at the rear of said wheel-truss, and a seat supported by said springs for the purpose described.

17. In a vehicle of the character designated, the combination of a wheel-truss to the ends of which the wheels are journaled, said wheels, shafts attached to the said wheel-truss and formed with extensions beyond the rear of said truss, compressible coiled springs in front of the said wheel-truss, compressible coiled springs supported upon the shafts at the rear of said wheel-truss, means for preventing the lateral displacement of each and all of said four springs and a seat supported by said springs for the purpose described.

18. In a vehicle of the character designated, the combination of a wheel-truss to the ends of which the wheels are journaled, said wheels, shafts attached to said wheel-truss, a plurality of compressible coiled springs supported by said shafts floating trussed cross-bars, and a seat supported on said springs for the purpose described.

19. In a vehicle of the character designated, the combination of a wheel-truss to the ends of which the wheels are journaled, said wheels, shafts attached to said wheel-truss, a plurality of compressible coiled springs supported by said shafts, means for sustaining said springs against lateral displacement and a seat supported on said springs for the purpose described.

20. In a vehicle of the character designated, a wheel-truss, trussed floating cross-bars, and a seat resting upon a plurality of compressible coil-springs mounted upon stationary parts of the frame and upon which said cross-bars rest for the purpose described.

HENRY J. MILLER.

Witnesses:
D. W. GARDNER,
GEO. WM. MIATT.